United States Patent [19]

Yano

[11] Patent Number: 5,261,698
[45] Date of Patent: Nov. 16, 1993

[54] SHOULDER BELT POSITION ADJUSTING DEVICE FOR A SEAT BELT ASSEMBLY

[75] Inventor: Hideaki Yano, Shiga, Japan

[73] Assignee: Takata Corporation, Tokyo, Japan

[21] Appl. No.: 835,492

[22] Filed: Feb. 14, 1992

[30] Foreign Application Priority Data

Mar. 4, 1991 [JP] Japan .................................. 3-37358

[51] Int. Cl.⁵ .............................................. B60R 22/00
[52] U.S. Cl. ............................................ 280/808; 464/7
[58] Field of Search ................... 280/801, 808; 464/7, 464/57, 173

[56] References Cited

U.S. PATENT DOCUMENTS

| | | | |
|---|---|---|---|
| 1,481,078 | 1/1924 | Albertson | 464/57 X |
| 1,911,470 | 5/1933 | Rosner | 464/173 |
| 1,939,766 | 12/1933 | Corset | 464/173 X |
| 2,090,174 | 8/1937 | Albright | 464/7 |
| 3,085,406 | 4/1963 | Hanebuth | 464/57 X |
| 4,280,338 | 7/1981 | Shannon et al. | 464/7 |
| 4,547,717 | 10/1985 | Radermacher et al. | 280/808 |
| 4,706,993 | 11/1987 | Tamura | 280/808 |
| 4,892,331 | 1/1990 | Wollner et al. | 280/808 |

FOREIGN PATENT DOCUMENTS

| | | | |
|---|---|---|---|
| 3744577 | 7/1989 | Fed. Rep. of Germany | 280/808 |
| 99444 | 4/1990 | Japan | 280/801 |
| 2235617 | 3/1991 | United Kingdom | 280/808 |

*Primary Examiner*—David M. Mitchell
*Assistant Examiner*—Gary C. Hoge
*Attorney, Agent, or Firm*—Kanesaka and Takeuchi

[57] ABSTRACT

A shoulder belt position adjusting device for a seat belt assembly comprises a belt anchor through which a shoulder belt is loosely inserted, an anchor support block supporting the belt anchor, a guide rail for slidably holding the anchor support block, a screw shaft extending along the length of the guide rail and threadably engaged with the anchor support block, a drive cable including an outer cable, and an inner cable inserted into the outer cable and having a front end connected to the screw shaft, and a drive unit connected to the rear end of the inner cable. The screw shaft is rotated to move the anchor support block along the guide rail. A plurality of ribs extend from the outer peripheral surface of the inner cable and are spaced apart from one another along the length of the inner cable.

6 Claims, 4 Drawing Sheets

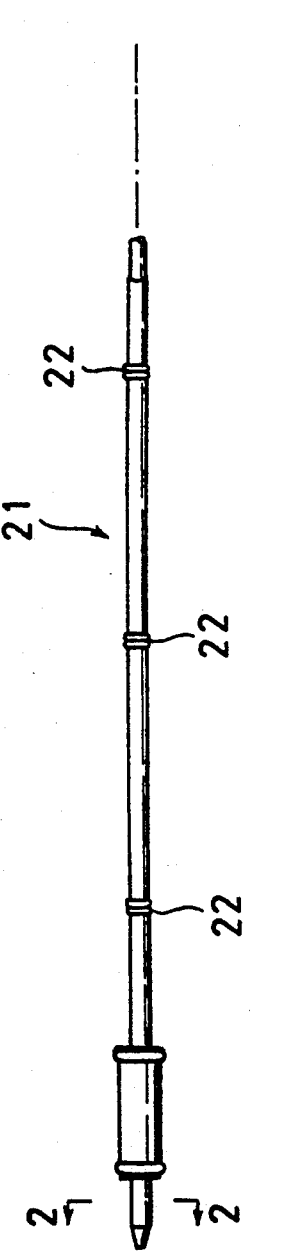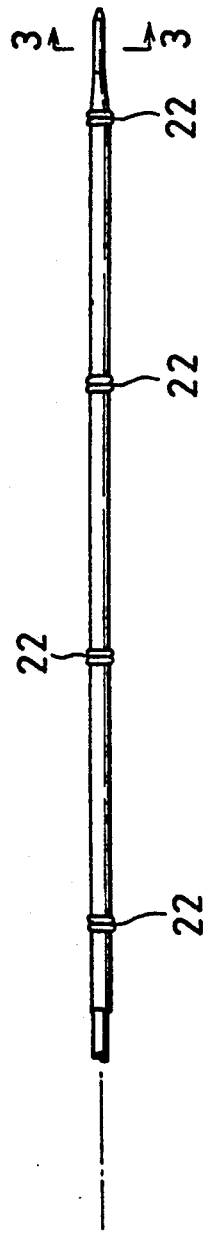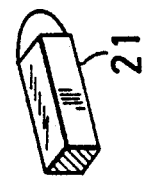

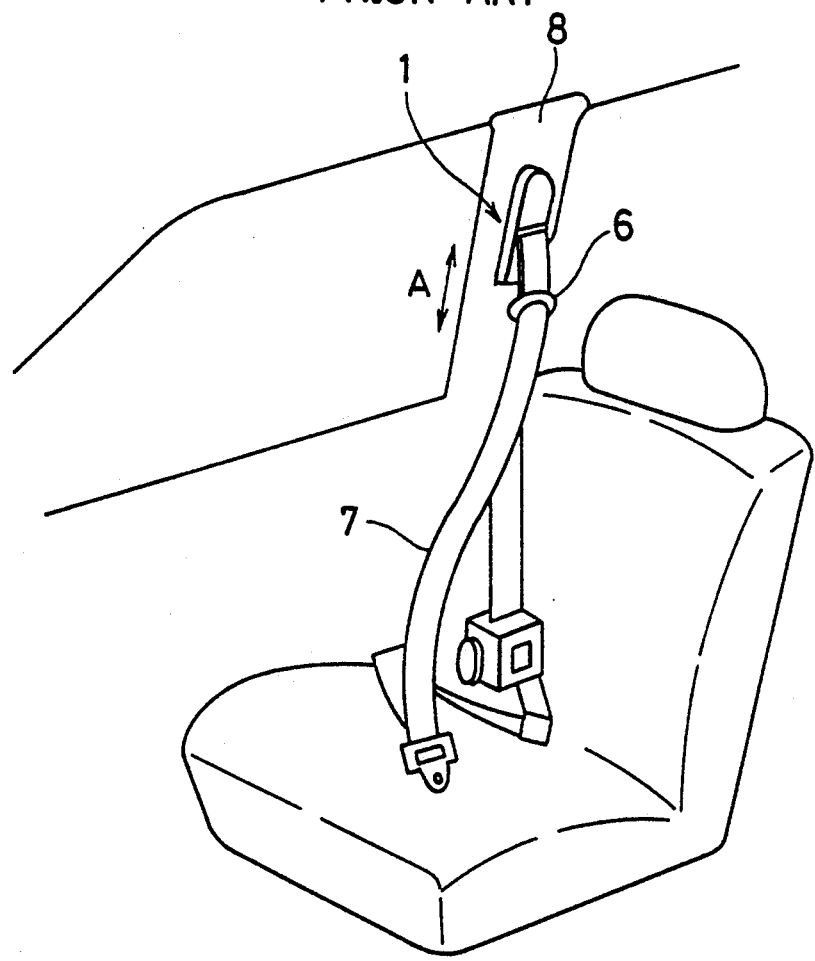

SHOULDER BELT POSITION ADJUSTING DEVICE FOR A SEAT BELT ASSEMBLY

FIELD OF THE INVENTION

The present invention relates to a seat belt assembly used to restrain and protect an occupant seated in an automotive vehicle and more particularly, to a device for adjusting the position of a shoulder belt of a seat belt. The present invention specifically relates to an improved shoulder belt position adjusting device designed to reduce operating noise which may occur when the position of the shoulder belt is adjusted.

RELATED ART

In general, an automotive vehicle includes a seat belt to restrain and protect a vehicle occupant in a seat in emergency situations such as a collision.

A portion of the seat belt which restrains a vehicle occupant must have sufficient strength to withstand sudden loads which may be several ten times greater than the weight of the occupant. It is therefore preferable to normally engage a lap belt around a hipbone and locate a shoulder belt between shoulder joints and the neck.

The size of occupants to be restrained by the seat belt varies widely from children to adults. Additionally, a seat may be adjusted to various positions according to the occupants.

To this end, there has previously been proposed a device for adjusting the position of a shoulder belt of a seat belt wherein a belt anchor of the shoulder belt can be adjusted to best retrain each occupant.

FIGS. 5 to 7 illustrate such a conventional device for adjusting the position of a shoulder belt of a seat belt.

As illustrated, the prior art shoulder belt position adjusting device comprises a substantially U-shaped mounting member 2 attached to a vehicle center pillar 8, a screw shaft 3 rotatably mounted between ends 2a, 2b bent from opposite ends of the mounting member 2, and an anchor support block 4 threaded on the screw shaft 3. The anchor support block 4 is moved in the direction of the arrow A and guided by a pair of guide rails 2d, 2d when the screw shaft 3 is rotated. In FIG. 6, the reference numeral 5 indicates a mounting hole through which a belt anchor 6 is mounted. A shoulder belt 7 is loosely held by the belt anchor 6.

Although not shown, a drive cable has a front end connected to the screw shaft 3 and a rear end connected to a motor. The drive cable includes an outer cable, and an inner cable inserted into the outer cable and connected to the screw shaft 3 and the motor.

In the shoulder belt position adjusting device 1 thus far described, the anchor support block 4 has an internally threaded surface threadably engaged with an externally threaded surface of the screw shaft 3. When the motor is driven to rotate the screw shaft 3 through the drive cable, the anchor block 4 is moved along the guide rails 2d, 2d.

With the prior art device, however, mechnical noise may be generated when the outer surface of the inner cable is in sliding contact with the inner peripheral surface of the outer cable. A vehicle occupant is uncomfortable with such noise and may assume that the noise is due to a mechanical failure.

OBJECT AND SUMMARY OF THE INVENTION

Accordingly, it is an object of the present invention to provide a shoulder belt position adjusting device for a seat belt assembly, which is able to reduce operating (sliding) noise.

Another object of the present invention is to improve occupant's comfortness in a vehicle compartment.

A further object of the present invention is to prevent a vehicle occupant to misunderstand that operating noise may be due to a machanical failure.

The present invention provides a shoulder belt position adjusting device for a seat belt assembly comprising a belt anchor through which a shoulder belt is loosely inserted, an anchor support block for supporting the belt anchor, a guide rail for slidably holding the anchor support block, a screw shaft extending along the length of the guide rail and threadably engaged with the anchor support block, a drive cable including an outer cable, and an inner cable inserted into the outer cable and having a front end connected to the screw shaft, and a drive unit connected to the rear end of the inner cable, the screw shaft being rotated to move the anchor support block along the guide rail, characterized in that a plurality of ribs extend from the outer peripheral surface of the inner cable and are spaced apart from one another along the length of the inner cable.

The distance between adjacent ribs is in the range of between 20 and 80 mm, and preferably 30 and 70 mm. The ribs are preferably made of synthetic resin such as polyethylene so as to provide better sliding and sound-proofing properties.

With the shoulder belt position adjusting device for a seat belt assembly according to the present invention, only ends of the ribs contact the inner peripheral surface of the outer cable during sliding movement of the inner cable. This reduces the area of sliding contact between the outer peripheral surface of the inner cable and the outer peripheral surface of the inner cable and thus, results in a substantial decrease in mechanical noise which may occur during rotation of the drive cable.

Additionally, grease is contained within the drive cable. The grease is safely retained between adjacent ribs to help reduce mechanical noise.

BRIEF DESCRIPTION OF THE DRAWINGS

FIG. 1 is a side view of an inner cable used in an embodiment;

FIG. 2 is a sectional view taken along the line 2—2 of FIG. 1;

FIG. 3 is a perspective sectional view taken along the line 3—3 of FIG. 1;

FIG. 7 is a perspective view of a shoulder belt position adjusting device for a seat belt assembly.

DESCRIPTION OF THE PREFERRED EMBODIMENTS

As shown in FIG. 1, an inner cable 21 has a plurality of ribs 22 spaced approximately 50 mm apart from one another. The ribs 22 are slidably moved on the inner peripheral surface of an outer cable. As shown in FIGS. 2 and 3, opposite ends of the inner cable 21 are rectangular in section so as to transmit drive torque.

Figure 4:
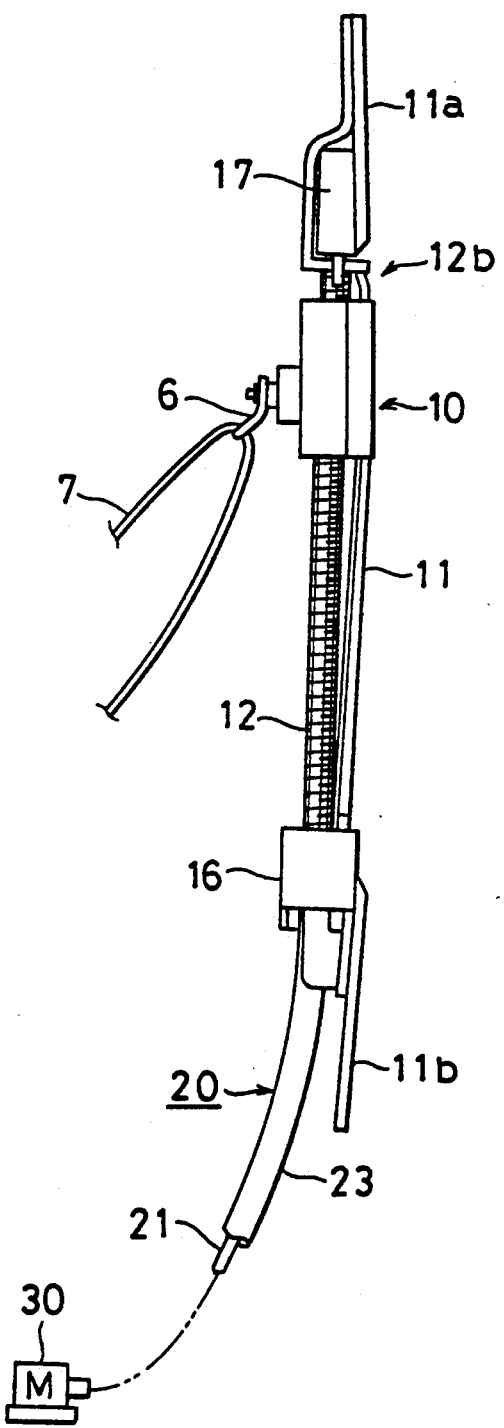
FIG. 4 is a side view of a shoulder belt position adjusting device for a seat belt assembly according to one embodiment of the present invention.
Figure 5:
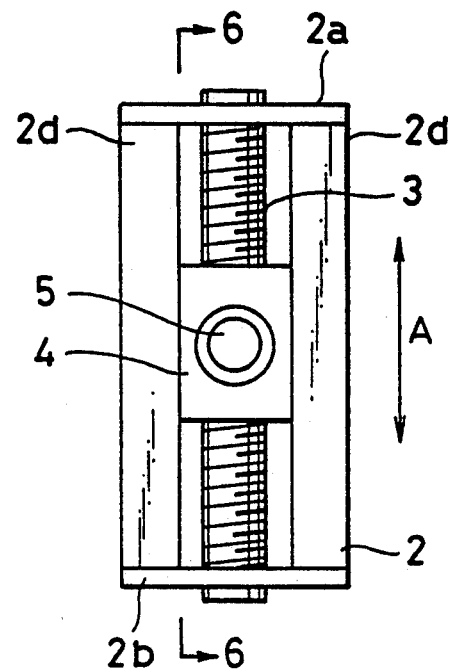
FIG. 5 is a front view of a conventional shoulder belt position adjusting device for a seat belt assembly.
Figure 6:
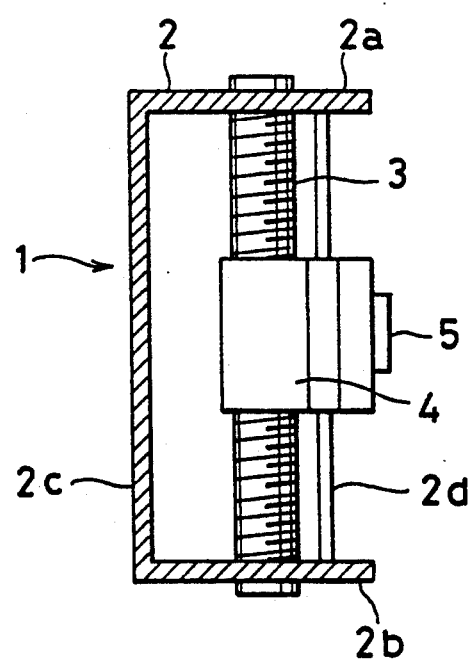
FIG. 6 is a sectional view taken along the line 6—6 of FIG. 5.

FIG. 4 is a side view of a shoulder belt position adjusting device for a seat belt assembly connected to a drive cable which includes the inner cable.

As shown in FIG. 4, the shoulder belt position adjusting device for a seat belt assembly comprises an anchor support block (hereinafter referred to as a slider) 10 adapted to support a belt anchor 6, a guide rail 11 by which the slider 10 is slidably held, a screw shaft 12 having opposite ends rotatably supported at the guide rail 11, and an internally threaded member (not shown) engaged with the screw shaft 12 and mounted to the slider. The internally threaded member is moved along the guide rail 11 as the screw shaft 12 is rotated. The internally threaded member and the slider 10 together form an anchor support block.

The guide rail 11 is curved to correspond to the shape of a vehicle center pillar and has opposite ends 11a, 11b in which bolt holes (not shown) are formed to mount the guide rail to the center pillar. Two bearing blocks 16, 17 are provided adjacent to the opposite ends of the screw shaft 12 to rotatably support the screw shaft 12.

The inner cable 21 of the drive cable 20 is connected to the lower end of the screw shaft 12 to transmit a drive force from a motor 30. 23 is an outer cable.

With the shoulder belt position adjusting device thus constructed, the screw shaft 12 is rotated through the inner cable to move the slider 10 up and down so as to provide for positional adjustment of the belt anchor 6.

The ribs 22 of the inner cable 21 have ends slidably moved on the inner peripheral surface of the outer cable 23 to reduce noise. Each rib 22 includes an annular indentation on an outer rib surface to reduce the contact area between the rib surface and the outer cable. Grease is applied in the outer cable 23. The grease is advantageously retained by the ribs 22 to substantially reduce noise which may otherwise occur during sliding movement of the inner cable 21.

What is claimed is:

1. A shoulder belt position adjusting device for a seat belt assembly comprising:
   a belt anchor through which a shoulder belt is loosely inserted;
   an anchor support block for supporting said belt anchor;
   a guide rail for slidably holding said anchor support block;
   a screw shaft extending along the length of said guide rail and threadably engaged with said anchor support block;
   a drive cable including an outer cable, and an inner cable inserted into said outer cable and having a front end connected to said screw shaft;
   drive means for rotating said screw shaft to move said anchor support block along said guide rail, said drive means being connected to the inner cable;
   a plurality of ribs extending from an outer peripheral surface of said inner cable and spaced apart from one another along the length of said inner cable so as to prevent direct contact of said inner cable with said outer cable, each rib including an annular indentation on an outer rib surface to reduce a contact area between the rib surface and the outer cable; and
   grease contained between said inner cable and said outer cable, said ribs preventing flow of the grease along the length of the cable so that the grease is retained by the ribs to substantially reduce noise during movement of the inner cable.

2. The device of claim 1, wherein said ribs extend around said inner cable.

3. The device of claim 1, said ribs are spaced approximately 20 to 80 mm.

4. The device of claim 1, said ribs are spaced approximately 30 to 70 mm.

5. The device of claim 1, wherein said ribs are made of synthetic resin to provide sliding and soundproofing properties.

6. The device of claim 5, wherein said synthetic resin is polyethylene.

* * * * *